(12) United States Patent
Cheney et al.

(10) Patent No.: US 7,759,611 B2
(45) Date of Patent: Jul. 20, 2010

(54) PORTABLE HEAT SEALING APPARATUS

(76) Inventors: James Cheney, P.O. Box 2284, Clovelly, 2031 (AU); Maobang Tsai, Jidali Industrial Zone, Gonghe Village, Shajing Town, Baoan, Shenzhen City, Guangdong (CN)

( * ) Notice: Subject to any disclaimer, the term of this patent is extended or adjusted under 35 U.S.C. 154(b) by 35 days.

(21) Appl. No.: 12/269,252

(22) Filed: Nov. 12, 2008

(65) Prior Publication Data

US 2010/0116809 A1 May 13, 2010

(51) Int. Cl.
*H05B 3/06* (2006.01)
*H05B 3/16* (2006.01)
*B30B 15/34* (2006.01)

(52) U.S. Cl. .................... 219/243; 219/227; 219/228; 219/542; 156/229; 156/583.9

(58) Field of Classification Search .............. None
See application file for complete search history.

(56) References Cited

U.S. PATENT DOCUMENTS

| 6,326,594 B1 * | 12/2001 | Chang et al. | 219/243 |
| 6,392,198 B1 * | 5/2002 | Yao | 219/243 |
| 6,450,088 B1 * | 9/2002 | Hutchinson | 219/243 |
| 6,770,849 B2 * | 8/2004 | Chou et al. | 219/243 |
| 6,933,470 B2 * | 8/2005 | Baptista | 219/243 |
| 6,998,577 B2 * | 2/2006 | Chou et al. | 219/243 |
| 7,034,252 B2 * | 4/2006 | Chang et al. | 219/243 |
| 7,315,010 B2 * | 1/2008 | Chou et al. | 219/243 |
| 2002/0185484 A1 * | 12/2002 | Chang et al. | 219/243 |
| 2004/0020913 A1 * | 2/2004 | Hovorka | 219/243 |

* cited by examiner

*Primary Examiner*—Joseph M Pelham
(74) *Attorney, Agent, or Firm*—Rabin & Berdo, P.C.

(57) ABSTRACT

The present invention is a portable heat sealing apparatus with a safety circuit design. The portable heat sealing apparatus comprises a body, a heating module, an upper case and a power module. The heating module and the upper case ensure a smooth, continuous bond between facing surfaces of a plastic bag.

17 Claims, 10 Drawing Sheets

PORTABLE HEAT SEALING APPARATUS

FIELD OF THE INVENTION

The present invention relates to a heat sealing apparatus and more particularly to a portable heat sealing apparatus.

BACKGROUND OF THE INVENTION

Generally, two major types of sealing machine exist. One is a stationary sealing machine, and the other is a portable sealing machine. Both types have advantages and disadvantages. Stationary sealing machines are used most often for large packages and provide better sealing performance but consume lots of power. Portable sealing machines are used most often as kitchen appliances to seal smaller packages and consume less power. However, sealing machines with the advantages of both types are not available in the market. Therefore, people either have to buy both or accept the inherent disadvantages of the one they purchase.

Because portable sealing machines are small and have a small heat sealing region of 1~2 centimeters, they are easy for people to grip and squeeze. However, sealing a large plastic bag smoothly and efficiently can be challenging.

Conventional sealing machines generally comprise a base, an optional power module or power cord, a cover, a heating module and optional over-current protection. When the cover is pressed toward the base, power is provided to the heating module, and the heating module generates heat to seal a plastic bag. The protection circuit will deactivate the heating module to prevent the sealing machine from overheating and damaging the sealing machine. However, it only protects the sealing machine itself but not a person operating the sealing machine. For example, if a child plays with the sealing machine and does not notice or understand that the heating module is activated, she or he may be burned.

SUMMARY OF THE INVENTION

The first objective of the present invention is to provide a portable heat sealing apparatus with a longer sealing region, especially to use for large plastic bags for better performance.

The second objective of the present invention is to provide a heat sealing apparatus with a detachable holder, so that users can either use it as a portable or a fixed sealing machine.

The third objective of the present invention is to provide a heat sealing apparatus with a safety circuit that prevents damaging the heat sealing apparatus when operating the heat sealing apparatus and keeps children from being burned.

The forth objective of the present invention is to provide an environmentally friendly heat sealing apparatus by connecting ceramic rings to the sealing region. The ceramic rings heat more evenly due to their adiabatic (insulating) characteristic.

The fifth objective of the present invention is to keep a heat sealing apparatus heating element straight with an elastic assembly so seal bonds are smooth and continuous.

The present invention is directed more particularly to a portable heat sealing apparatus with a safety circuit and detachable holder, the heat sealing apparatus comprising a heating module, an upper case, a power module and a body and provides a smooth sealing bond between facing surfaces of a plastic bag.

The present invention is a portable heat sealing apparatus with a safety circuit design. The portable heat sealing apparatus comprises a body, a heating module, an upper case and a power module. The heating module and the upper case ensure a smooth, continuous bond between facing surfaces of a plastic bag.

BRIEF DESCRIPTIONS OF THE DRAWINGS

FIG. 4b is an enlarged perspective view of a ceramic ring in the base of the portable heat sealing apparatus in FIG. 4a;

FIG. 5 is an exploded perspective view of a heating module of the portable heat sealing apparatus in FIG. 4a;

FIG. 6 is a top-front perspective view of the base of the portable heat sealing apparatus in FIG. 4a;

DETAILED DESCRIPTION OF THE PRESENT INVENTION

With reference to FIGS. 1, 2, 8 and 9 a portable heat sealing apparatus in accordance with the present invention closes and seals plastic bags and comprises a body (1), a heating module (2), an upper case (3), a power module (4) and an optional hanger assembly (5).

Figure 4A:
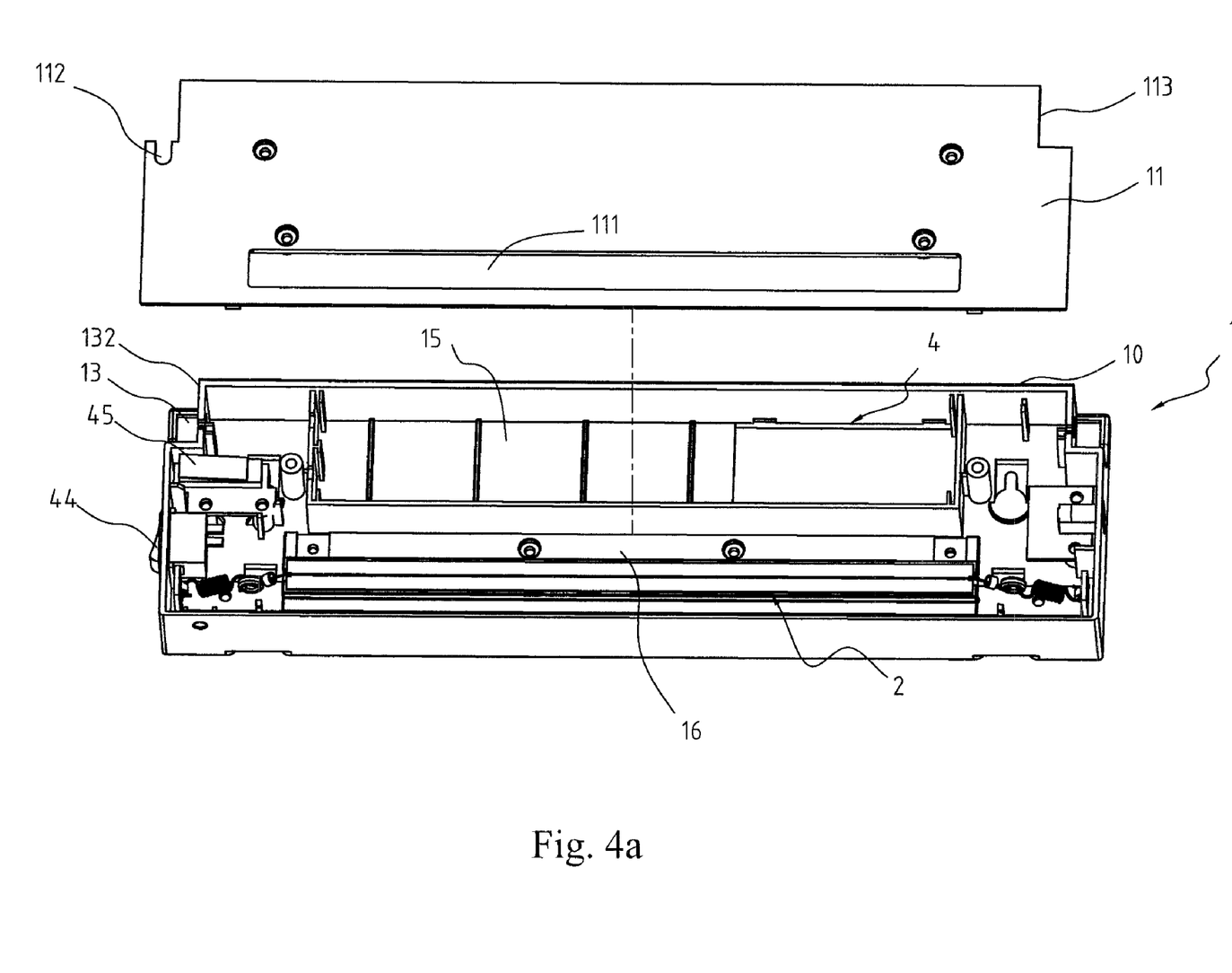
FIG. 4a is an exploded perspective view of a base and cover of the portable heat sealing apparatus in FIG. 1.
Figure 4B:
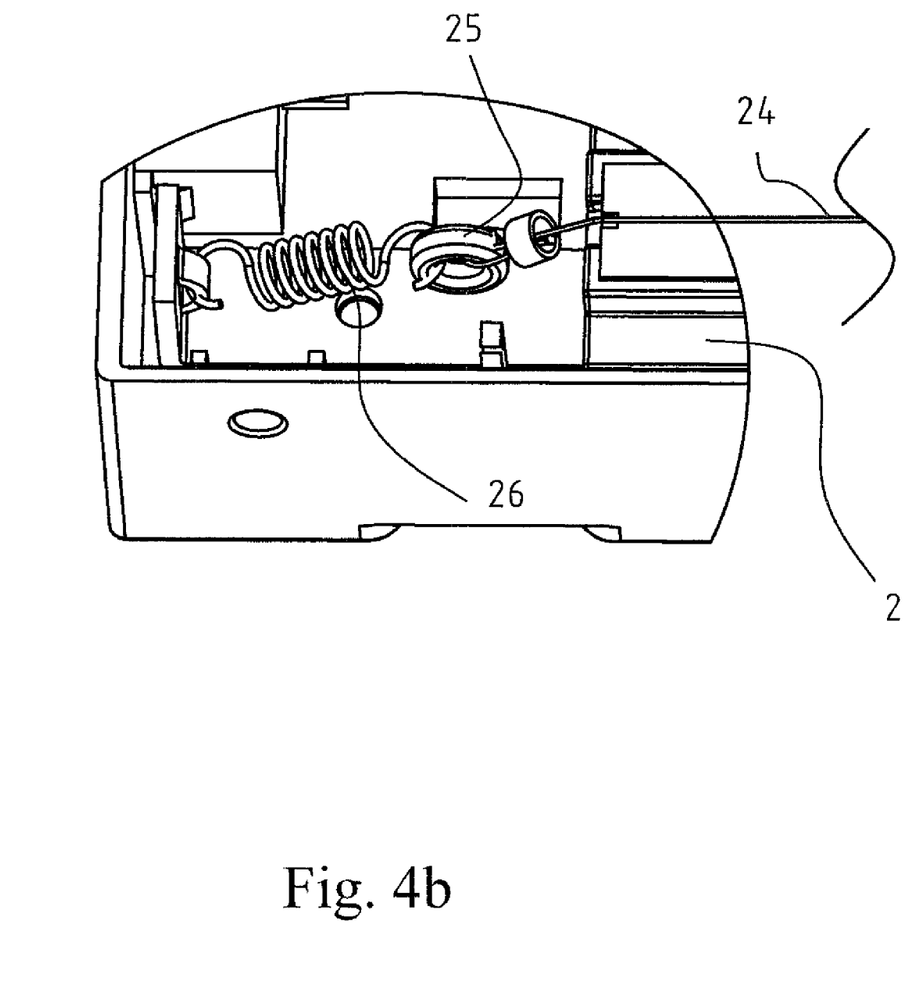

With further reference to FIGS. 4a and 4b, the body (1) comprises a base (10) and an optional cover (11).

The base (10) has two ends, a rear wall, a front wall, an outer surface, an open top and a bottom surface and comprises two optional hinge slots (13), a heating module compartment (16), a battery compartment (15) and multiple optional transverse mounting slots (19), at least one optional hanging lip (18) or both.

The rear wall has an optional electrical cord hole.

The hinge slots (13) are formed respectively on the ends of the base (10) and communicate with the rear wall, and each hinge slot (13) has an inner wall (131) and a mounting hole (132). The inner wall (131) is parallel to the end wall. The mounting hole (132) is formed through the inner wall (131) and aligns with the mounting hole (132) in the inner wall (131) of the other hinge slot (13).

The heating module compartment (16) is formed in the base (10) adjacent to the front wall.

The battery compartment (15) is formed inside the base (10) against the rear wall and has at least two contacts (151), a battery access hole (152) and a battery access panel (153). The battery access hole (152) is formed through the bottom surface of the base (10) and communicates with the battery compartment (15). The battery access panel (153) is removably mounted in and closes the battery access hole (152).

The multiple transverse slots (19) are eccentric holes formed through the bottom surface of the base (10).

The at least one hanging lip (18) is formed on and protrudes from the bottom surface of the base (10).

The cover (11) is mounted on and closes the open top of the base (10) and has a front edge, two rear corners, a heating slot (111), two optional hinge notches (113) and an activation hole (112). The heating slot (111) is formed near the front edge and corresponds to the heating module compartment (16) in the base (10). The hinge notches (113) are formed respectively in the rear corners and correspond respectively to the hinge slots (13) in the base (10). The activation hole (112) is formed through the cover (11) near the end corresponding to the safety switch (17), is aligned with the safety switch (17) and may communicate with the corresponding hinge slot (13).

Figure 5:
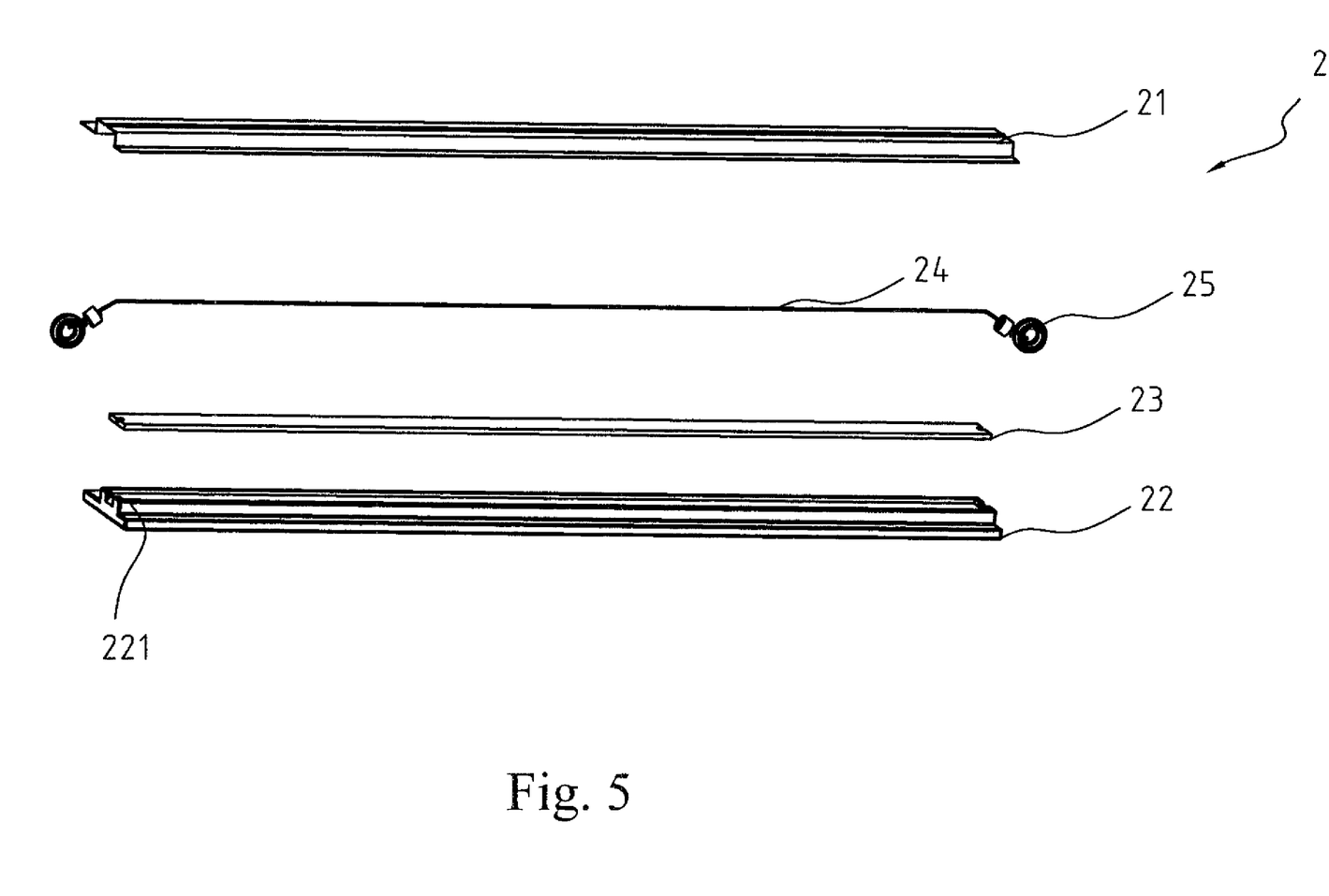

With further reference to FIG. 5, the heating module (2) is mounted longitudinally in the heating module compartment (16) of the base (10), protrudes through the heating slot (111) in the cover (11) and comprises an adiabatic (insulating) stand (22), an adiabatic (insulating) pad (23), a heating element (24), two ceramic rings (25), two elastic elements (26) and an adiabatic (insulating) sheet (21).

The adiabatic stand (22) has a longitudinal ridge (221).

The adiabatic pad (23) is mounted longitudinally on the longitudinal ridge (221) of the adiabatic stand (22).

The heating element (24) generates heat when current passes through it, is mounted longitudinally on the adiabatic pad (23), has two ends and may be a resistance wire.

The ceramic rings (25) are connected respectively to the ends of the heating element (24).

The elastic elements (26) are connected respectively to the ends of the base (10) and respectively to the ceramic rings (25) to hold the heating element (24) taut and securely on the adiabatic pad (23) and in the base (10).

The adiabatic sheet (21) covers the heating element (24) and the adiabatic pad (23) so the heating element (24) will not burn a hole in a plastic bag being sealed by the heat sealing apparatus.

Figure 1:
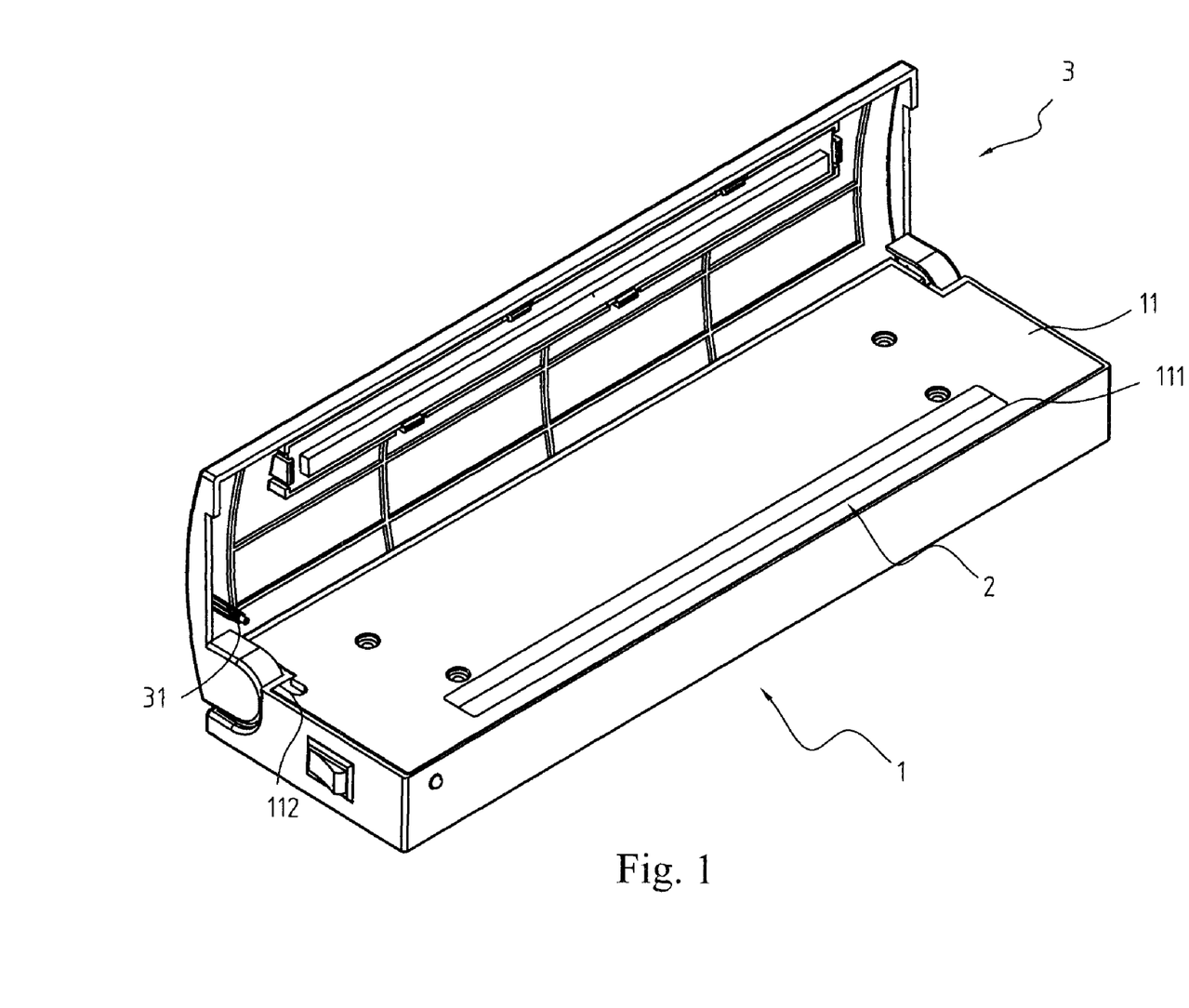
FIG. 1 is a perspective view of a portable heat sealing apparatus in accordance with the present invention.
Figure 2:
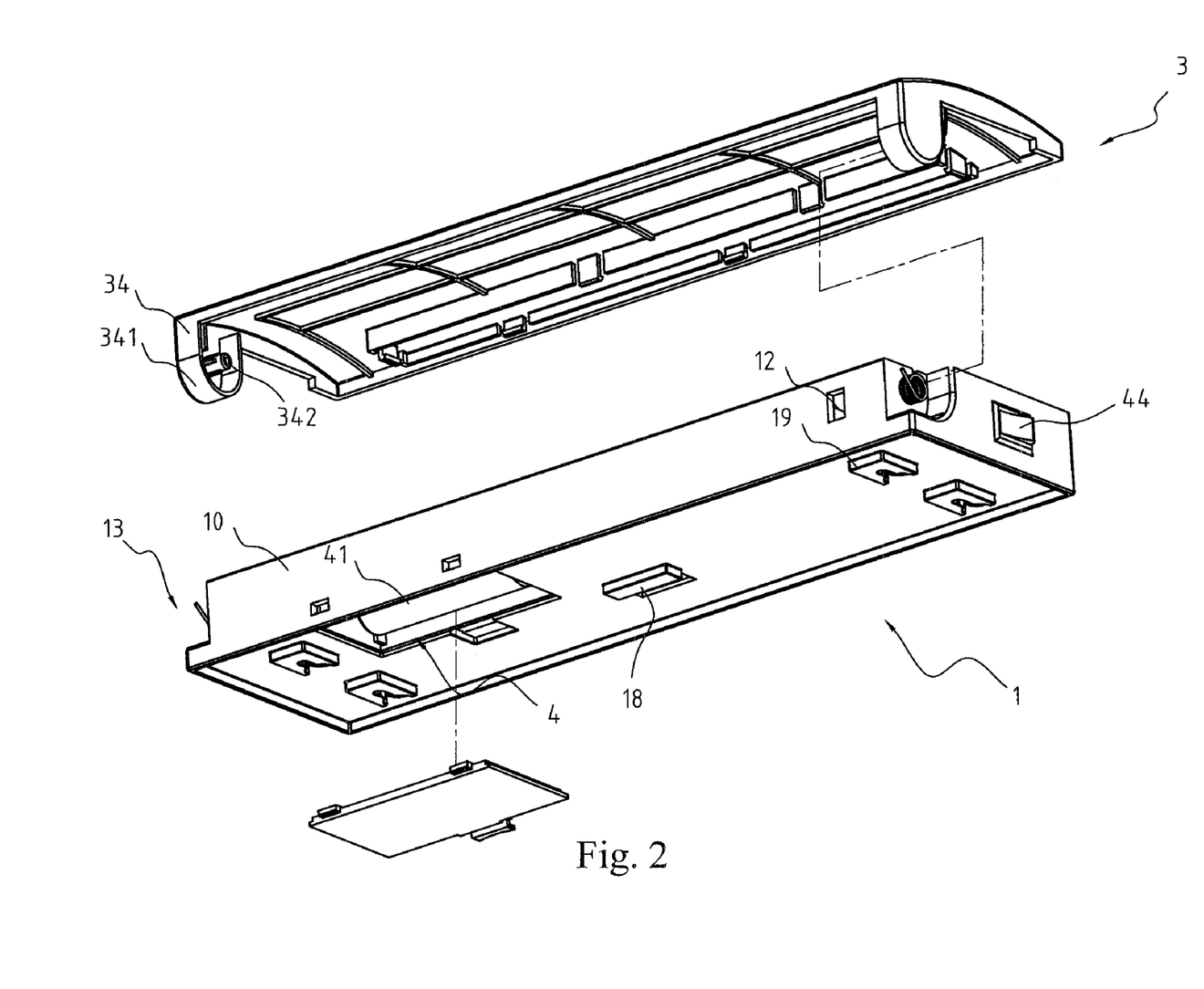
FIG. 2 is a bottom-rear exploded perspective view of the portable heat sealing apparatus in FIG. 1.
Figure 3:
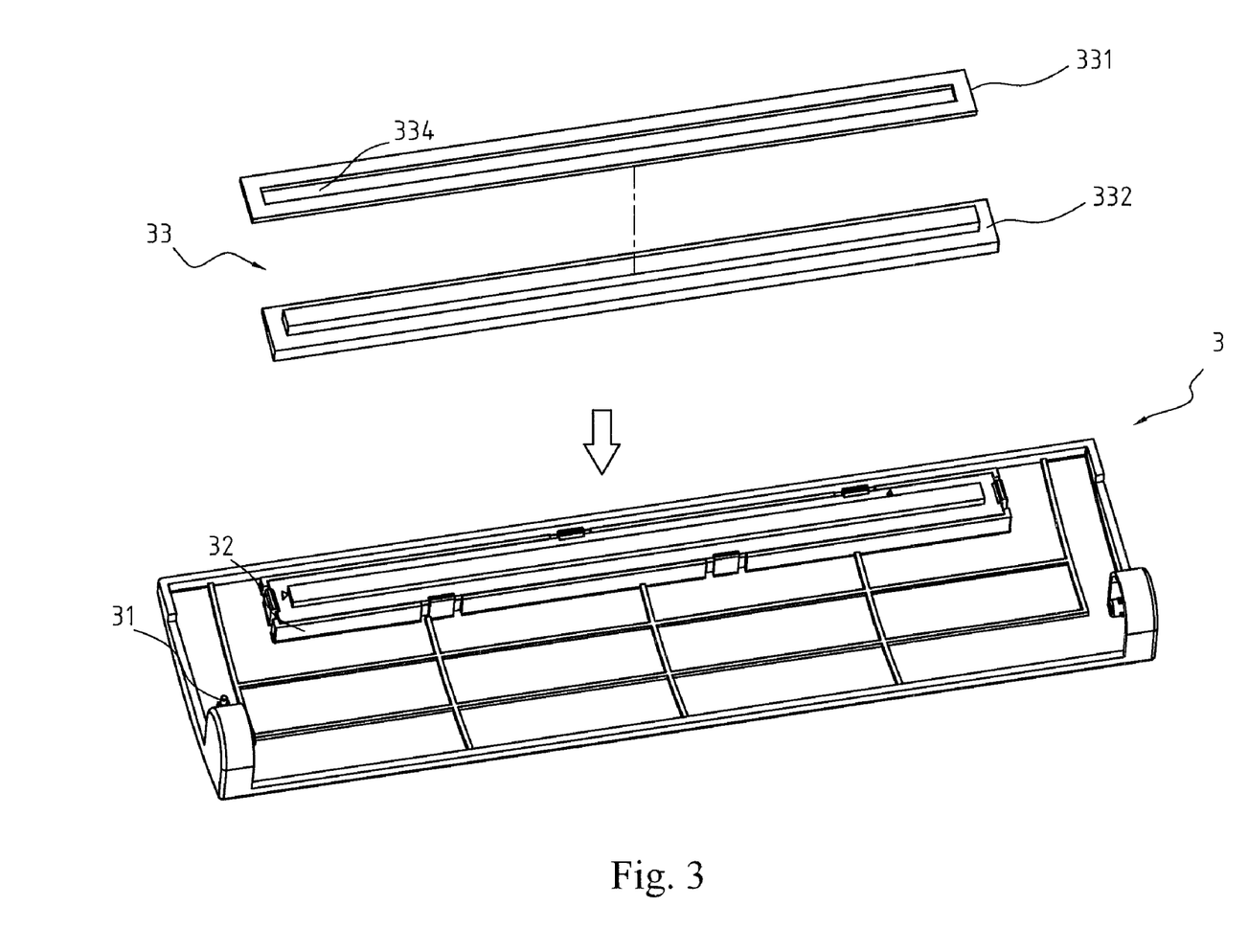
FIG. 3 is an exploded, bottom-rear perspective view of an upper case of the portable heat sealing apparatus in FIG. 1.

With further reference to FIG. 3. the upper case (3) is connected pivotally to and covers the base (10), presses a plastic bag against the adiabatic sheet (21) so the heating element (24) can heat and seal the plastic bag, has an inner surface, two ends, a rear edge and a front edge and comprises an activation rod (31), a mounting slot (32), a press (33) and two optional hinges (34).

The activation rod (31) is formed on and protrudes down from the upper case (3) and corresponds to and presses the safety switch (17) when the upper case (3) is pressed against the base (10).

The mounting slot (32) is formed parallel to the front edge of the upper case (3) and corresponds to the heating module (2).

The press (33) comprises a contact pad (332) and a mounting frame (331).

The contact pad (332) is a strip of resilient material, is mounted securely in the mounting slot (32) and has two exposed surfaces.

The exposed surfaces comprise a recessed outer surface and a protruding central surface. The protruding central surface presses a plastic bag against the adiabatic sheet (21) to ensure a smooth and efficient seal.

The mounting frame (331) is a strip of stiff insulating material, has a central longitudinal through hole (334) corresponding to the protruding central surface of the contact pad (332), is mounted in the mounting slot (32) against the recessed surface of the contact pad (332) around the protruding central surface. and holds the press (33) securely in the mounting slot (32).

The hinges (34) are formed respectively on the two ends at the rear edge, protrude down from the inner surface and correspond to and are mounted pivotally respectively in the two hinge slots (13) in the base (10), and each hinge (34) has a leaf (341), a pintle (342) and a resilient element (343).

The leaf (341) protrudes down from the inner surface of the upper case (3) and corresponds to and is mounted pivotally in the corresponding hinge slot (13) in the base (10).

The pintle (342) is formed on and protrudes in from the leaf (341) and is mounted rotatably in the mounting hole (132) in the corresponding hinge slot (13).

The resilient element (343) is mounted around the pintle (342), keeps the upper case (3) from resting against the base (10) and may be a torsional spring.

Figure 6:
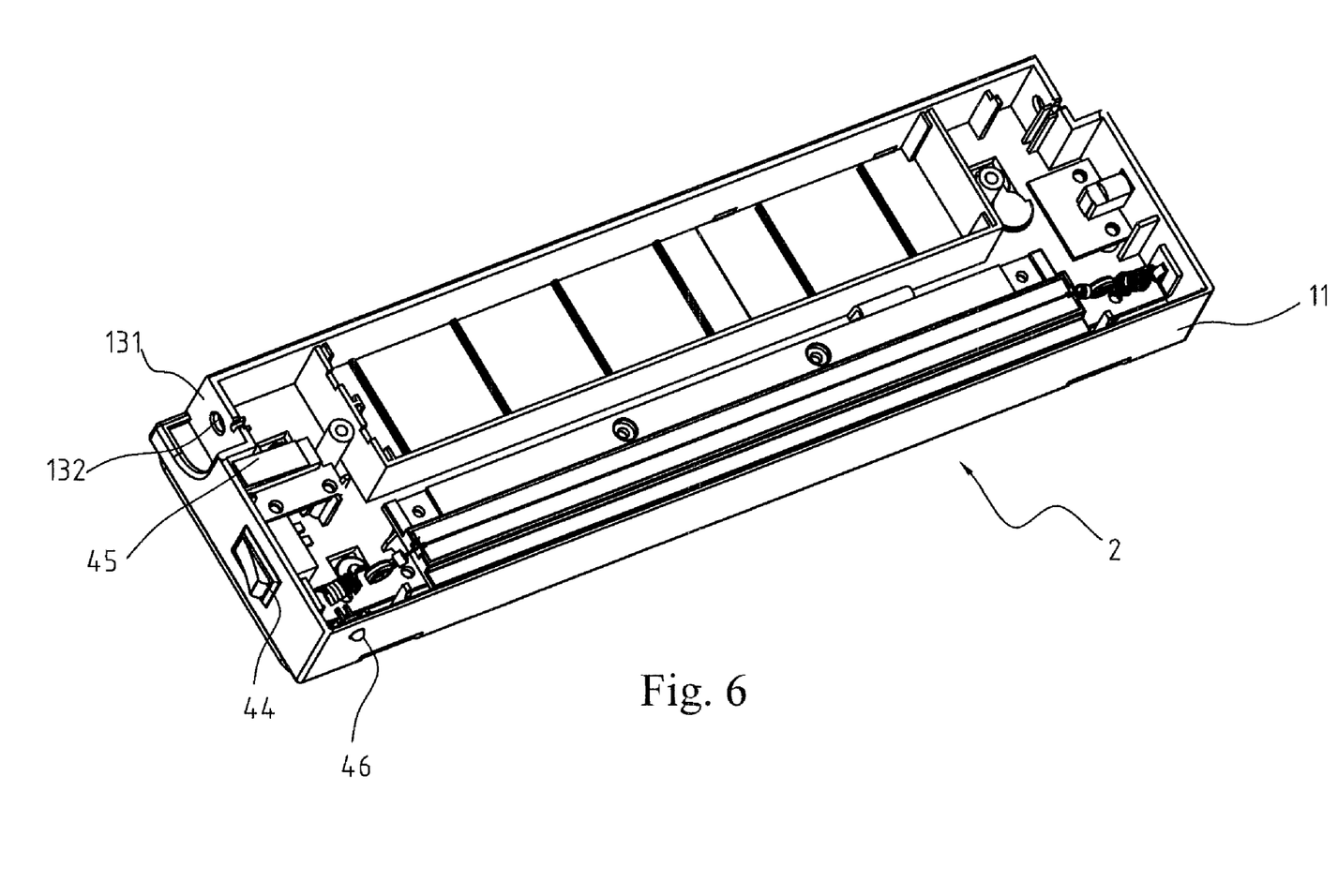
Figure 7A:
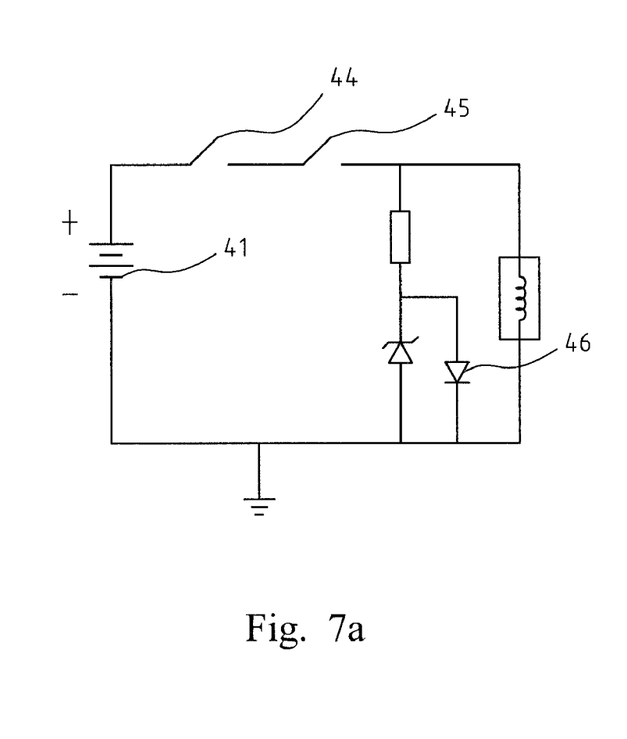
FIG. 7a is a circuit diagram of a driving circuit of the portable heat sealing apparatus in FIG. 1 using a DC power source.
Figure 7B:
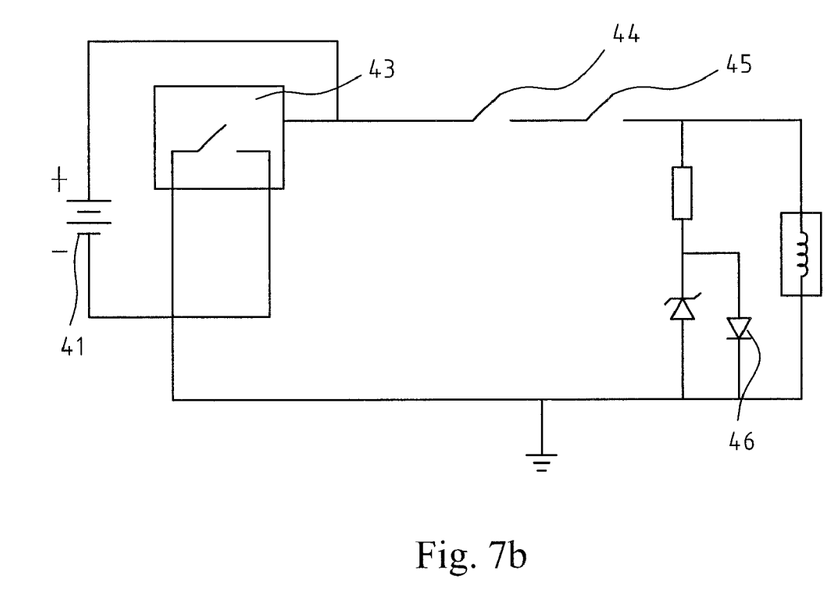
FIG. 7b is a circuit diagram of a driving circuit of the portable heat sealing apparatus in FIG. 1 using an AC power source.

With reference to FIGS. 6 and 7b, the power module (4) provides DC power to electrical components of the portable heat sealing apparatus and comprises at least one optional battery (41), a circuit board, an optional electric cord (42), an optional rectifier (43), an optional selector switch, an enabling switch (44), a safety switch (45) and an optional visual indicator (46) (such as an LED).

The at least one battery (41) is mounted in the battery compartment (15), connects to the contacts (151) in the battery compartment (15), is removable and provides DC power to operate the portable heat sealing apparatus.

The circuit board is mounted in the base (10) and connects electrical components of the portable heat sealing apparatus to a DC power source.

The electric cord (42) connects to an external AC power source and extends though the electrical cord hole in the rear wall into the body (10).

The rectifier (43) is connected to the electric cord (42) to convert AC power to DC power and provides DC power.

The selector switch is mounted in the base (10) and selects either the at least one battery (41) or the rectifier (43) as the DC power source.

The enabling switch (44) is mounted inside the base (10), protrudes through the outer surface and enables the portable heat sealing apparatus.

The safety switch (45) is mounted in the base (10) adjacent to one end of the base (10) below the activation hole (112), corresponds to the activation rod (31), is a microswitch, is connected electrically to the enabling switch (43), provides DC power to the heating module (2) when the upper module (3) is pressed toward the base (10) and the activation rod (31) presses the safety switch (43).

The visual indicator (46) is connected in parallel with the heating element (24), shines when the portable heat sealing apparatus is operating, is mounted inside the base (10) and protrudes through the outer surface, and is connected electrically to the safety switch (45).

Figure 8:
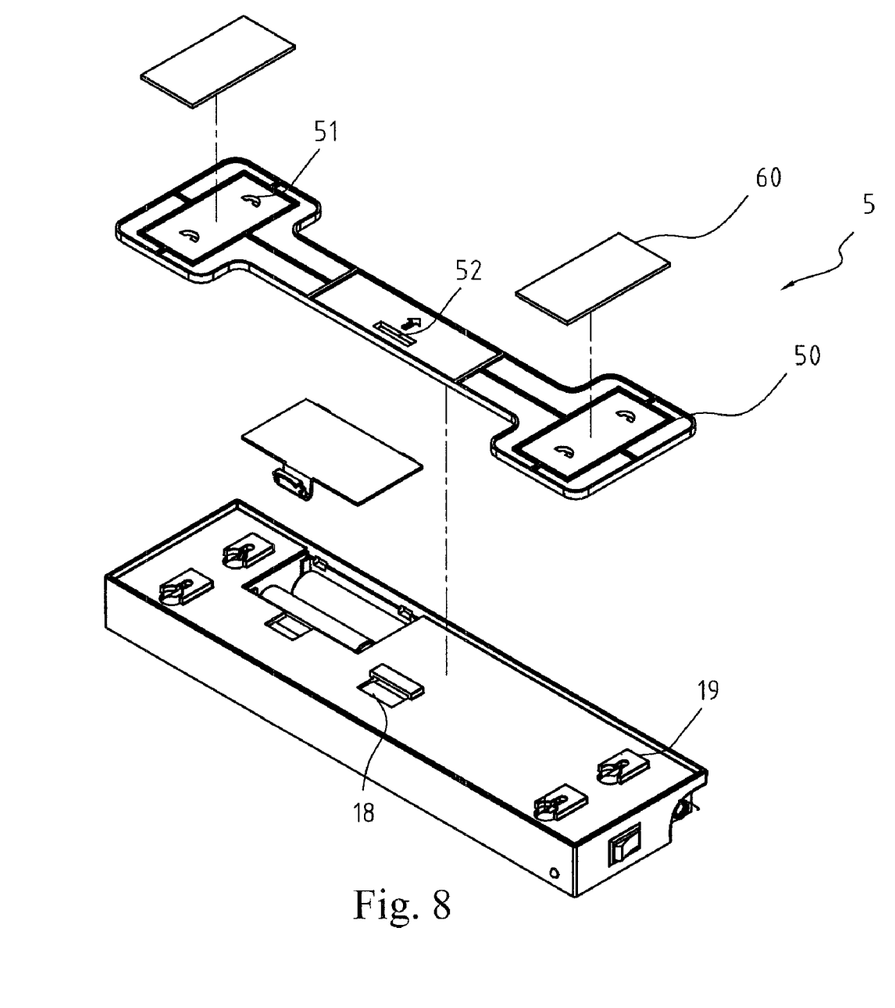
FIG. 8 is an exploded perspective view of a detachable holder of the portable heat sealing apparatus in FIG. 1.
Figure 9:
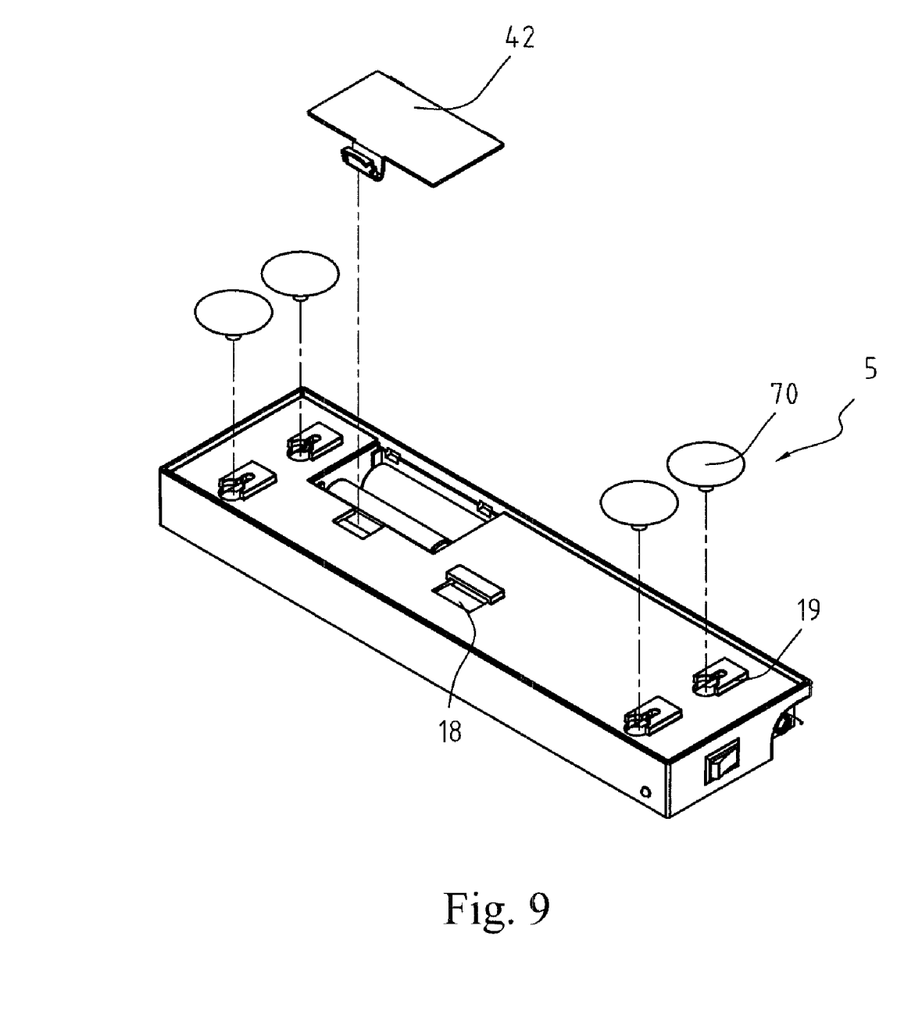
FIG. 9 is an exploded bottom perspective view of connectors mounted on the outer bottom of the base of the portable heat sealing apparatus in FIG. 1.

The hanger assembly (5) allows the portable heat sealing apparatus to be detachably mounted securely on a smooth surface and comprises a hanger panel (50) and at least one wall connector (60) or multiple suction cups (70).

The hanger panel (50) attaches to a vertical surface and to the bottom surface of the base (10) and has a contact surface, an exposed surface and multiple optional hooks (51), at least one optional stationary hanger (52) or both.

The hooks (51) are formed on and protrude from the exposed surface of the hanger panel (50) and are engaged respectively by the transverse slots (19) of the base (10) to securely hold the portable heat sealing apparatus.

The at least one stationary hanger (52) is formed on and protrudes from the exposed surface of the hanger panel (50) and is complementary to and engaged by the at least one hanging lip (18) on the base (10).

The at least one wall connector (60) connects the hanger panel (50) to a vertical surface, is connected securely to the contact surface of the hanger panel (50) and may be two-sided pressure tape, a magnet or the like.

The suction cups (70) are mounted detachably respectively in the transverse slots (19) in the bottom surface of the base (10).

People skilled in the art will understand that various changes, modifications, and alterations in form and details may be made without departing from the spirit and scope of the invention.

What is claimed is:

1. A portable heat sealing apparatus comprising:
   a body comprising a base having two ends, a rear wall, a front wall, an outer surface, an open top and a bottom surface, and comprising
      a heating module compartment formed in the base adjacent to the front wall; and
      a battery compartment formed inside the base against the rear wall and having
         at least two contacts;
         a battery access hole formed through the bottom surface of the base and communicating with the battery compartment; and
         a battery access panel removably mounted in and closing the battery access hole;
   a heating module mounted longitudinally in the heating module compartment of the base and comprising
      an insulating stand having a longitudinal ridge;
      an insulating pad mounted longitudinally on the longitudinal ridge of the insulating stand;
      a heating element generating heat when current passes through it, being mounted longitudinally on the insulating pad and having two ends;
      two ceramic rings connected respectively to the ends of the heating element;
      two elastic elements connected respectively to the ends of the base and respectively to the ceramic rings to hold the heating element taut and securely on the insulating pad and in the base; and
      an insulating sheet covering the heating element and the insulating pad;
   an upper case connected pivotally to and covering the base, pressing a plastic bag against the insulating sheet so the heating element can heat and seal the plastic bag, having an inner surface, two ends, a rear edge and a front edge and comprising
      an activation rod formed on and protruding down from the upper case and corresponding to and pressing the safety switch when the upper case is pressed against the base;
      a mounting slot formed parallel to the front edge of the upper case and corresponding to the heating module; and
      a press comprising
         a contact pad being a strip of resilient material, being mounted securely in the mounting slot and having two exposed surfaces comprising
            a recessed outer surface; and
            a protruding central surface pressing a plastic bag against the insulating sheet to ensure a smooth and efficient seal; and
         a mounting frame being a strip of stiff insulating material, having a central longitudinal through hole corresponding to the protruding central surface of the contact pad, being mounted in the mounting slot against the recessed surface of the contact pad around the protruding central surface, and holding the press securely in the mounting slot; and
   a power module providing DC power to electrical components of the portable heat sealing apparatus and comprising
      a circuit board mounted in the base and connecting electrical components of the portable heat sealing apparatus to a DC power source;
      an enabling switch mounted inside the base, protruding through the outer surface and enabling the portable heat sealing apparatus; and
      a safety switch mounted in the base adjacent to one end of the base, corresponding to the activation rod, being a microswitch, being connected electrically to the enabling switch, and providing DC power to the heating module when the upper module is pressed toward the base and the activation rod presses the safety switch.

2. The portable heat sealing apparatus as claimed in claim 1, wherein the heating element is a resistance wire.

3. The portable heat sealing apparatus as claimed in claim 1, wherein
   the body further comprises a cover mounted on and closing the open top of the base and has
      a front edge;
      two rear corners;
      a heating slot formed near the front edge and corresponding to the heating module compartment in the base; and
      an activation hole formed through the cover near the end corresponding to the safety switch and being aligned with the safety switch; and
   the heating module protrudes through the heating slot in the cover; and
   the safety switch is mounted below the activation hole.

4. The portable heat sealing apparatus as claimed in claim 1, wherein
   the base further comprises two hinge slots formed respectively on the ends of the base and communicating with the rear wall, each hinge slot having
      an inner wall parallel to the end wall; and
      a mounting hole formed through the inner wall and aligning with the mounting hole in the inner wall of the other hinge slot;
   the cover further has two hinge notches formed respectively in the rear corners and corresponding respectively to the hinge slots in the base; and
   the upper case further comprises two hinges formed respectively on the two ends at the rear edge, protruding down from the inner surface and corresponding to and being mounted pivotally respectively in the two hinge slots in the base, each hinge having
      a leaf protruding down from the inner surface of the upper case and corresponding to and being mounted pivotally in the corresponding hinge slot in the base;
      a pintle formed on and protruding in from the leaf and being mounted rotatably in the mounting hole in the corresponding hinge slot; and
      a resilient element mounted around the pintle and keeping the upper case from resting against the base.

5. The portable heat sealing apparatus as claimed in claim 1, wherein the power module further comprises
   at least one battery mounted in the battery compartment, connecting to the contacts in the battery compartment, being removable and providing DC power to operate the portable heat sealing apparatus; and a visual indicator connected in parallel with the heating element, shining when the portable heat sealing apparatus is operating, being mounted inside the base, protruding through the outer surface of the base and being electricity connected to the safety switch.

6. The portable heat sealing apparatus as claimed in claim 1, wherein
the rear wall of the base has an electrical cord hole; and
the power module further comprises
an electric cord connecting to an external AC power source and extending though the electrical cord hole in the rear wall into the body;
a rectifier connected to the electric cord to convert AC power to DC power and provides DC power; and
a visual indicator connected in parallel with the heating element, shining when the portable heat sealing apparatus is operating, being mounted inside the base, protruding through the outer surface of the base and being electricity connected to the safety switch.

7. The portable heat sealing apparatus as claimed in claim 1 further comprising a hanger assembly allowing the portable heat sealing apparatus to be detachably mounted securely on a smooth surface and comprising
a hanger panel attaching to a vertical surface and the bottom surface of the base and having
a contact surface; and
an exposed surface; and
at least one wall connector connecting the hanger panel to a vertical surface and being connected securely to the contact surface of the hanger panel.

8. The portable heat sealing apparatus as claimed in claim 1, wherein
the base further comprises multiple slots that extend in a direction transverse to a length of the base and being eccentric holes formed through the bottom surface of the base; and
the portable heat sealing apparatus further comprises a hanger assembly allowing the portable heat sealing apparatus to be detachably mounted securely on a smooth surface and comprising multiple suction cups being mounted respectively in the slots in the bottom surface of the base.

9. The portable heat sealing apparatus as claimed in claim 1, wherein
the base further comprises at least one hanging lip formed on and protruding from the bottom surface of the base; and
the portable heat sealing apparatus further comprises a hanger assembly allowing the portable heat sealing apparatus to be detachably mounted securely on a smooth surface and comprising
a hanger panel attaching to a vertical surface and to the bottom surface of the base and having
a contact surface;
an exposed surface; and
at least one stationary hanger formed on and protruding from the exposed surface of the hanger panel and being complementary to and engaged by the at least one hanging lip on the base; and
at least one wall connector connecting the hanger panel to a vertical surface and being connected securely to the contact surface of the hanger panel.

10. The portable heat sealing apparatus as claimed in claim 1, wherein
the base further comprises multiple slots that extend in a direction transverse to a length of the base and being eccentric holes formed through the bottom surface of the base; and
the portable heat sealing apparatus further comprises a hanger assembly allowing the portable heat sealing apparatus to be detachably mounted securely on a smooth surface and comprising
a hanger panel attaching to a vertical surface and to the bottom surface of the base and having
a contact surface;
an exposed surface; and
multiple optional hooks being formed on and protruding from the exposed surface of the hanger panel and being complementary to and engaged respectively by the slots on the base; and
at least one wall connector connecting the hanger panel to a vertical surface and being connected securely to the contact surface of the hanger panel.

11. The portable heat sealing apparatus as claimed in claim 3, wherein the activation hole communicates with the corresponding hinge slot.

12. The portable heat sealing apparatus as claimed in claim 4, wherein the resilient element of each hinge is a torsional spring.

13. The portable heat sealing apparatus as claimed in claim 5, wherein the visual indicator is an LED.

14. The portable heat sealing apparatus as claimed in claim 6, wherein the visual indicator is an LED.

15. The portable heat sealing apparatus as claimed in claim 7, wherein the wall connector is a two-sided pressure tape.

16. The portable heating sealing apparatus as claimed in claim 7, wherein the wall connector is a magnet.

17. The portable heat sealing apparatus as claimed in claim 1, wherein
the base further comprises
two hinge slots formed respectively on the ends of the base and communicating with the rear wall, and each hinge slot having
an inner wall parallel to the end wall; and
a mounting hole formed through the inner wall and aligning with the mounting hole in the inner wall of the other hinge slot;
multiple mounting slots that extend in a direction transverse to a length of the base and being eccentric holes formed through the bottom surface of the base; and
at least one hanging lip formed on and protruding from the bottom surface of the base;
the rear wall of the base has an electrical cord hole;
the body further comprises a cover mounted on and closing the open top of the base and has
a front edge;
two rear corners;
two hinge notches formed respectively in the rear corners and corresponding respectively to the hinge slots in the base;
a heating slot formed near the front edge and corresponding to the heating module compartment in the base;
an activation hole formed through the cover near the end corresponding to the safety switch and being aligned with the safety switch;
the heating module protrudes through the heating slot in the cover;
the heating element is a resistance wire;
the upper case further comprises two hinges formed respectively on the two ends at the rear edge, protruding down from the inner surface and corresponding to and being mounted pivotally respectively in the two hinge slots in the base, and each hinge having
    a leaf protruding down from the inner surface of the upper case and corresponding to and being mounted pivotally in the corresponding hinge slot in the base;
    a pintle formed on and protruding in from the leaf and being mounted rotatably in the mounting hole in the corresponding hinge slot; and
    a resilient element mounted around the pintle and keeping the upper case from resting against the base;

the safety switch is mounted below the activation hole;

the power module further comprises
    at least one battery mounted in the battery compartment, connecting to the contacts in the battery compartment, being removable and providing DC power to operate the portable heat sealing apparatus;
    an electric cord connecting to an external AC power source and extending though the electrical cord hole in the rear wall into the body;
    a rectifier connected to the electric cord to convert AC power to DC power and provides DC power;
    a selector switch mounted in the base and selecting either the at least one battery or the rectifier as the DC power source; and
    a visual indicator connected in parallel with the heating element, shining when the portable heat sealing apparatus is operating, being mounted inside the base, protruding through the outer surface of the base and being electricity connected to the safety switch;

the portable heat sealing apparatus further comprises a hanger assembly allowing the portable heat sealing apparatus to be detachably mounted securely on a smooth surface and comprising
    a hanger panel attaching to a vertical surface and the bottom surface of the base and having
        a contact surface;
        an exposed surface;
        multiple hooks formed on and protruding from the exposed surface of the hanger panel and being engaged respectively by the slots of the base to securely hold the portable heat sealing apparatus; and
        at least one stationary hanger formed on and protruding from the exposed surface of the hanger panel and being complementary to and engaged by the at least one hanging lip on the base; and
    at least one wall connector connecting the hanger panel to a vertical surface and being connected securely to the contact surface of the hanger panel.

* * * * *